(No Model.)
J. O'CONNOR & C. A. TURNER.
STEAM GAGE.
No. 566,613. Patented Aug. 25, 1896.
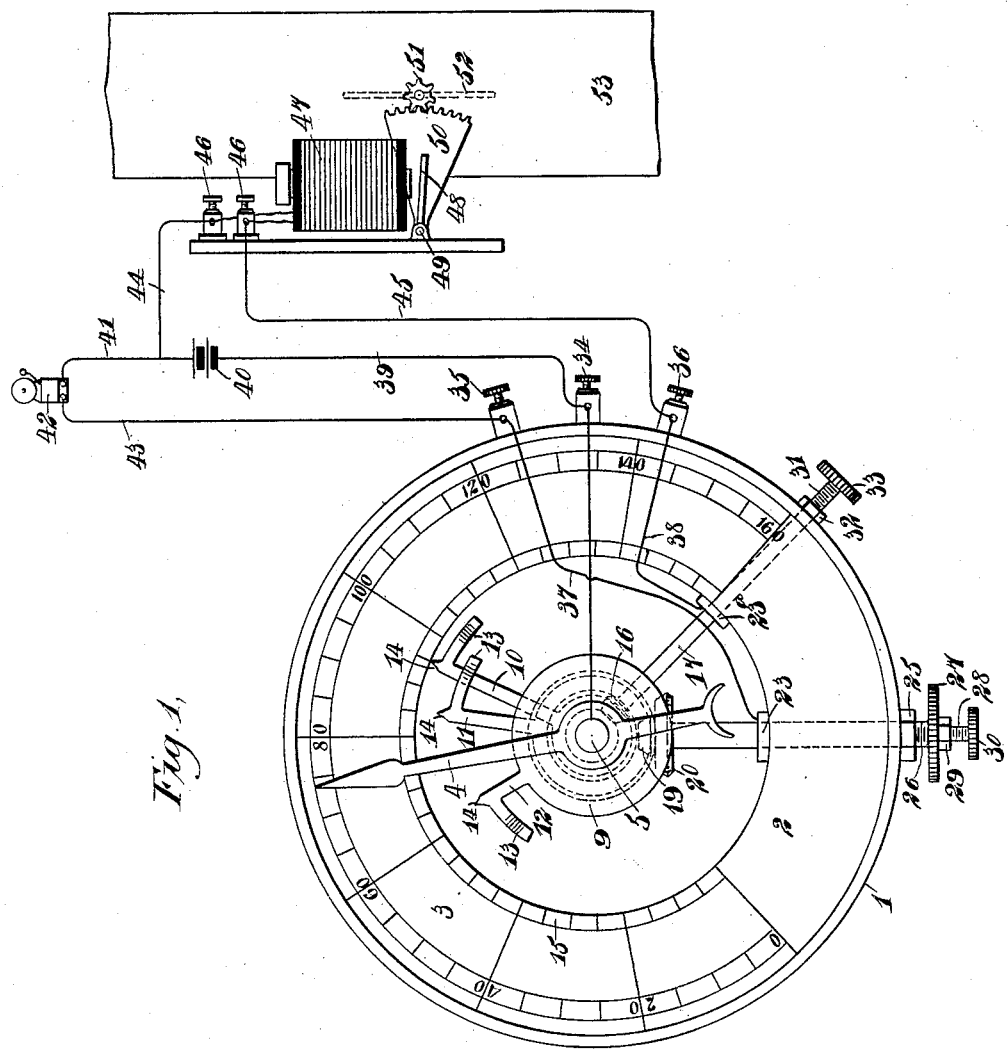
Fig. 1.
Fig. 2.
WITNESSES:
Edward Thorpe
J. B. Caplinger
INVENTORS
J. O'Connor
C. A. Turner
BY
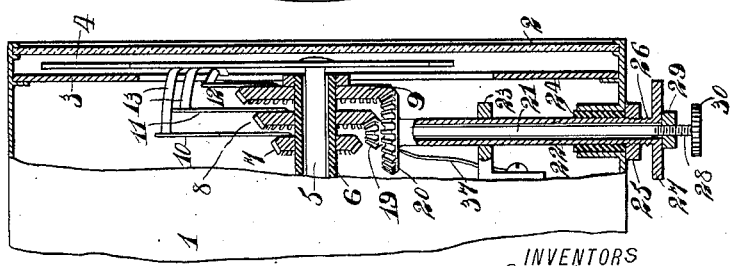
ATTORNEYS.

UNITED STATES PATENT OFFICE.

JOHN O'CONNOR AND COLLATINUS A. TURNER, OF NEW YORK, N. Y., ASSIGNORS TO JOHN O'CONNOR AND COLLATINUS A. TURNER, OF SAME PLACE, AND DAVID D. TURNER, OF JERSEY CITY, NEW JERSEY.

STEAM-GAGE.

SPECIFICATION forming part of Letters Patent No. 566,613, dated August 25, 1896.

Application filed March 20, 1896. Serial No. 584,128. (No model.)

*To all whom it may concern:*

Be it known that we, JOHN O'CONNOR and COLLATINUS A. TURNER, of New York city, in the county and State of New York, have invented new and useful Improvements in Steam-Gages, of which the following is a full clear, and exact description.

This invention relates to certain improvements in gages such as are used on steam-boilers to indicate the pressure of the steam, and has for its object to provide a steam-gage having means whereby the excessive rise or fall of the steam-pressure within the boiler will be at once indicated and an alarm sounded to give warning thereof, and also having means whereby upon the rise of the steam-pressure above a predetermined limit a valve or damper will be operated to reduce the draft through the flue or chimney.

The invention consists in a steam-gage having a scale and an index arranged to travel over the same to indicate the steam-pressure in the boiler, a contact arranged in the path of the index, an electric circuit including said contact, and an electrically-operated device controlled by the electric circuit when closed.

The invention also consists in certain novel features of the construction, combination, and arrangement of the various parts of the improved device whereby certain important advantages are attained and the steam-gage is made simpler, cheaper, and otherwise better adapted and more convenient for use than various other similar devices heretofore employed, all as will be hereinafter fully set forth.

The novel features of the invention will be carefully defined in the claims.

Reference is to be had to the accompanying drawings, forming a part of this specification, in which similar characters of reference indicate corresponding parts in both views.

Figure 1 is a face view of a steam-gage provided with our improvements, the electric circuit and electrically-operated devices being shown somewhat diagraphically; and Fig. 2 is a transverse sectional view taken through the steam-gage shown in Fig. 1.

In the views, 1 indicates the casing of the gage, which may be of the usual circular form, having a glass plate 2 across its front, beneath which plate is arranged an annular scale 3, graduated to indicate the steam-pressure in pounds. The scale 3 is adapted to be traversed by a pointer or index 4, carried on a shaft 5 arranged centrally in the casing and actuated by devices carried therein in the ordinary way.

6 indicates a sleeve of insulating material loosely embracing the shaft 5 carrying the pointer or index 4, and on said sleeve 6 are mounted to turn bevel gear-wheels 7, 8, and 9, of gradually-increasing diameters, the wheel 7 being the smallest and the wheel 9 the largest. The respective wheels 7, 8, and 9 are provided with pointers or index-fingers 10, 11, and 12 projecting radially from them, and each of said fingers 10, 11, and 12 is provided at its extremity with a spring-arm 13 extending up into the plane of and adapted to be engaged by the index or pointer 4 as the same plays over the scale 3. Each arm 13 will be by preference provided with rounded ends, so that the least possible resistance will be offered to the turning of the index 4.

Each of the index-fingers 10, 11, and 12 is provided with a pointed end 14, adapted to play over a scale 15 formed on the inside of the annular scale 3 and corresponding to the graduations over which the index 4 plays, and, as above stated, the wheels 7, 8, and 9 are adapted to be turned on the sleeve 6, so that the fingers 10, 11, and 12 and the arms 13 carried thereon may be adjusted to stand at different positions on the scale 3, whereby the electrically-operated devices may be actuated at different points, as will be hereinafter explained. A bevel-pinion 16 is employed for turning the wheel 7, said pinion 16 being, as shown in dotted lines in Fig. 1, carried on the end of a shaft 17 extending across the casing 1 at right angles to the rotative axis of the wheels 7, 8, and 9, and to turn the wheels 8 and 9 other bevel-pinions 19 and 20 are employed, meshing therewith and carried respectively on a shaft 21 and a sleeve 22 embracing said shaft, said shaft and sleeve being also arranged to extend transversely across the casing at right angles to the sleeve 6.

The central portions of the shaft 17 and of the sleeve 22 are mounted to turn in bearings 23 and 23ᵃ arranged in the casing 1, but insulated therefrom, and the outer ends of said shaft 17 and sleeve 22 are also insulated from the casing 1, being arranged to pass through sleeves of insulating material, as indicated at 24 in Fig. 2. The outer end of the sleeve 22 is screw-threaded, as indicated at 26, to receive a lock-nut 25, whereby said sleeve may be locked in place when the wheel 9 and the finger 12 carried thereon shall have been adjusted by turning the sleeve, and said sleeve is provided with an enlargement or head 27, whereby it may be conveniently turned. The shaft 21 is likewise provided with a screw-threaded portion 28, on which screws a lock-nut 29, serving to lock the wheel 8 and index 4 against movement, and said shaft is also provided with a head 30, whereby it may be turned. The shaft 17 is also provided with a headed outer end 33 and with a screw-threaded portion 31, on which screws a lock-nut 32.

The casing 1 is provided with binding-posts 34, 35, and 36, the binding-post 34 being in electrical communication with the casing itself, and through said casing with the shaft 5 and the index 4 carried thereon. The binding-post 35 is in connection by means of a wire 37 inside the casing with the insulated bearing 23 at the central portion of the sleeve 22, and through said portion and sleeve with the index-fingers 11 and 12 and the arms 13 thereon. From the binding-post 36 a wire 38 extends to the bearing 23ᵃ at the central portion of the shaft 17, so that said binding-post 36 is connected electrically through the intervening mechanisms with the index-finger 10 and the arm 13 thereon.

The index-fingers 11 and 12 are adapted in use to be adjusted on the scale 3 so that their arms 13 stand in position to be engaged by the index 4 when the steam-pressure in the boiler rises or falls to its upper and lower limits, and the arms 13 on said fingers 11 and 12 form terminals for the circuit including a wire 39 extending from the binding-post 34 to a battery 40, from which extends a wire 41 to a bell 42, whence extends a wire 43 back to the binding-post 35. By this arrangement it will be seen that when the index 4 comes in contact with the arm 13 of either of the fingers 11 and 12 the circuit is closed through the bell, and the same is sounded to give warning of the rise or fall of the steam-pressure in the boiler.

The finger 10 is adapted to be adjusted so that its arm 13 oscillates beyond or adjacent to the arm 13 of the finger 11 to close the bell-circuit when the boiler-pressure nears its outer limit, and when the index 4 comes in contact with the arm 13 of the finger 10 the circuit is closed through an electrically-actuated damper-operating device, the construction of which is shown in Fig. 1 and will be described.

From the battery 40 extends a wire 44 and from the binding-post 36 extends a wire 45, and these wires 44 and 45 are connected with binding-posts 46, connected with the terminals of an electromagnet 47, suitably mounted and provided with an armature 48 pivotally arranged as shown at 49, and carrying a segment-rack 50, meshing with a pinion 51 of the stem of a damper 52, arranged to control the flue or chimney 53, so that when the circuit is closed through the magnet 47 by the contact of the index 4 with the arm 13 on the finger 10 said damper 52 will be swung pivotally so as to close the flue 53, whereby the draft will be regulated and the boiler-pressure lowered. The damper 52 will be by preference provided with a weight on the outside, so that when the index 4 travels backward on the lowering of steam-pressure in the boiler said damper will resume its vertical position in the flue.

From the above description it will be seen that the device is of an extremely simple and inexpensive construction and is especially well adapted for the purposes for which it is intended, since it permits the contact device to be readily and conveniently adjusted so as to stand at different positions in the path of the index of the steam-gage; and it will also be seen that the invention is susceptible of some modification without material departure from its principles and spirit, and for this reason we do not wish to be understood as limiting ourselves to the precise form and arrangement of the parts herein set forth.

Having thus described our invention, we claim as new and desire to secure by Letters Patent—

1. The combination of a steam-gage, comprising a casing having a scale, a rotative shaft and an index on the shaft playing over the same, a sleeve surrounding but insulated from the shaft, a wheel mounted on the sleeve, a contact-arm on the wheel arranged in the path of the index, a shaft extending outside the casing and geared to the wheel for turning the same, and an electric circuit including the generator and an electrically-actuated device, said circuit having as its terminals the said index and contact-arm, substantially as set forth.

2. The combination of a steam-gage having a casing, a scale in the casing, a rotative shaft and an index on the shaft playing over the scale, wheels surrounding but insulated from the shaft, contact-arms carried by the wheels and arranged in the path of the index, a shaft extending outside the casing and having a pinion meshing with one of said wheels, a sleeve on the last-named shaft insulated from the casing and also extending outside the casing and provided with a pinion meshing with the other wheel, and an electric circuit including the generator and an electrically-actuated device, said circuit having as its terminals the said contact-arms and index, substantially as set forth.

3. A steam-gage, comprising a casing having a scale, a rotative shaft and an index on the shaft playing over the scale, wheels mounted to rotate on the shaft, but insulated therefrom, contact-arms on the wheels arranged in the path of the index, shafts extending through the casing for adjusting said wheels and the contact-arms, an electric circuit including a generator, an electromagnet in said circuit, the above-named index and contact-arms forming terminals for the circuit, and means operated by the electromagnet for operating a damper in one direction, substantially as specified.

JOHN O'CONNOR.
    COLLATINUS A. TURNER.

Witnesses:
 J. D. CAPLINGER,
 JNO. M. RITTER.